United States Patent
Wentink (10) Patent No.: US 11,026,169 B2
(45) Date of Patent: Jun. 1, 2021

(54) PHYSICAL LAYER POWER SAVE FACILITY

(75) Inventor: Maarten Menzo Wentink, Naarden (NL)

(73) Assignee: QUALCOMM INCORPORATED, San Diego, CA (US)

( * ) Notice: Subject to any disclaimer, the term of this patent is extended or adjusted under 35 U.S.C. 154(b) by 784 days.

(21) Appl. No.: 13/291,142

(22) Filed: Nov. 8, 2011

(65) Prior Publication Data

US 2012/0287850 A1 Nov. 15, 2012

Related U.S. Application Data (60) Provisional application No. 61/411,905, filed on Nov. 9, 2010, provisional application No. 61/414,872, filed on Nov. 17, 2010.

(51) Int. Cl.
*H04W 52/02* (2009.01)
*H04W 48/08* (2009.01)

(52) U.S. Cl.
CPC ... *H04W 52/0206* (2013.01); *H04W 52/0216* (2013.01); *H04W 52/0219* (2013.01); *H04W 48/08* (2013.01); *Y02D 30/70* (2020.08)

(58) Field of Classification Search
CPC ......... H04W 52/0206; H04W 52/0219; H04W 52/0216; H04W 48/08; Y02B 60/50; Y04D 30/70
USPC .......................... 370/312, 328, 338; 709/223
See application file for complete search history.

(56) References Cited

U.S. PATENT DOCUMENTS

| | | | |
|---|---|---|---|
| 5,790,952 A | 8/1998 | Seazholtz et al. | |
| 6,075,792 A | 6/2000 | Ozluturk | |
| 6,657,997 B1 | 12/2003 | Lide et al. | |
| 7,257,095 B2 | 8/2007 | Liu | |
| 7,630,403 B2* | 12/2009 | Ho | H04L 1/1621 370/389 |
| 8,059,609 B2 | 11/2011 | Kim et al. | |
| 8,126,998 B2* | 2/2012 | Ikeda | 709/223 |
| 8,315,346 B2* | 11/2012 | Kim et al. | 375/358 |
| 8,467,346 B2 | 6/2013 | Xiao | |
| 8,472,383 B1* | 6/2013 | Banerjea | H04W 72/0473 370/328 |
| 8,483,105 B2 | 7/2013 | Nanda et al. | |
| 8,971,213 B1 | 3/2015 | Hart | |

(Continued)

FOREIGN PATENT DOCUMENTS

| | | |
|---|---|---|
| CN | 1601997 A | 3/2005 |
| CN | 101047587 A | 10/2007 |

(Continued)

OTHER PUBLICATIONS

European Search Report—EP13020037—Search Authority—The Hague—dated Jul. 18, 2013.

(Continued)

*Primary Examiner* — Walter J Divito
*Assistant Examiner* — Anthony Luo
(74) *Attorney, Agent, or Firm* — Patterson+ Sheridan, L.L.P.

(57) ABSTRACT

Certain aspects of the present disclosure propose a method to transmit information in unused fields of a physical layer header to improve performance of the system. The proposed method transmits, during single user transmission, a portion of the basic service set identifier (BSSID) of an access point in a field of a header that is usually used to indicate number of space time streams (Nsts).

31 Claims, 6 Drawing Sheets

(56) References Cited

U.S. PATENT DOCUMENTS

| | | |
|---|---|---|
| 2003/0169769 A1 | 9/2003 | Ho et al. |
| 2006/0045035 A1 | 3/2006 | Liu |
| 2007/0217352 A1* | 9/2007 | Kwon ................... 370/312 |
| 2008/0013610 A1 | 1/2008 | Varadarajan et al. |
| 2008/0075028 A1 | 3/2008 | Park et al. |
| 2009/0268653 A1* | 10/2009 | Itagaki et al. ............ 370/311 |
| 2010/0046457 A1 | 2/2010 | Abraham et al. |
| 2010/0062798 A1 | 3/2010 | Poe et al. |
| 2010/0177656 A1 | 7/2010 | Kim et al. |
| 2010/0177757 A1 | 7/2010 | Kim et al. |
| 2010/0226315 A1 | 9/2010 | Das et al. |
| 2010/0260138 A1* | 10/2010 | Liu ................ H04L 5/0023 370/330 |
| 2010/0260159 A1 | 10/2010 | Zhang et al. |
| 2010/0293378 A1* | 11/2010 | Xiao et al. ................ 713/168 |
| 2011/0002319 A1* | 1/2011 | Husen et al. .............. 370/338 |
| 2011/0064040 A1 | 3/2011 | Kim et al. |
| 2011/0110293 A1* | 5/2011 | Hart et al. ................. 370/328 |
| 2011/0141932 A1 | 6/2011 | Iwao et al. |
| 2011/0188387 A1 | 8/2011 | Das et al. |
| 2011/0188424 A1 | 8/2011 | Ramamurthy et al. |
| 2012/0039266 A1 | 2/2012 | Abraham et al. |
| 2012/0044925 A1 | 2/2012 | Lee et al. |
| 2012/0300684 A1 | 11/2012 | Wentink |
| 2013/0343240 A1 | 12/2013 | Funakubo et al. |

FOREIGN PATENT DOCUMENTS

| | | |
|---|---|---|
| CN | 101056258 A | 10/2007 |
| EP | 1821419 A2 | 8/2007 |
| EP | 2045952 A2 | 4/2009 |
| JP | 2007221393 A | 8/2007 |
| JP | 2009509469 A | 3/2009 |
| JP | 2013513284 A | 4/2013 |
| JP | 2013523005 A | 6/2013 |
| KR | 100819285 B1 | 4/2008 |
| KR | 20100112176 A | 10/2010 |
| KR | 20150013050 A | 2/2015 |
| RU | 2009101269 A | 7/2010 |
| WO | 9006566 A1 | 6/1990 |
| WO | 2000016491 | 3/2000 |
| WO | 2005039127 | 4/2005 |
| WO | 2007038118 A2 | 4/2007 |
| WO | 2007105928 A1 | 9/2007 |
| WO | 2007109634 A1 | 9/2007 |
| WO | 2007144688 A1 | 12/2007 |
| WO | 2008075179 A2 | 6/2008 |
| WO | WO-2009109894 A1 | 9/2009 |
| WO | 2010118383 A1 | 10/2010 |
| WO | 2011068387 A2 | 6/2011 |
| WO | WO-2011115408 A2 | 9/2011 |

OTHER PUBLICATIONS

Bernard Aboa: "Virtual Access Points", IEEE P802.11 Wireless LANS, XX, XX, No. 802.11-03/154r1, May 22, 2003 (May 22, 2003), pp. 1-13, XP002425027.

IEEE 802.11, IEEE Standard for Information technology—Telecommunications and information exchange between systems—Local and metropolitan area networks—Specific requirements; Part 11: Wireless LAN Medium Access Control (MAC) and Physical Layer (PHY), 2007.

IEEE 802.11n-2009, "IEEE Standard for Information technology—Telecommunications and information exchange between systems—Local and metropolitan area networks—Specific requirements", Part 11: Wireless LAN Medium Access Control (MAC) and Physical Layer (PHY) Specifications, Amendment 5: Enhancements for Higher Throughput, IEEE Standard, IEEE, Piscataway, NJ, USA, Oct. 29, 2009 (Oct. 29, 2009), pp. C1-502, XP017604244.

International Search Report and Written Opinion—PCT/US2011/059965—ISA/EPO—dated May 2, 2012.

LG Electronics Inc. (Kang B., et al.), "PHY Power Saving Features for 11ac, IEEE 802.11-10/0785r1," Jul. 14, 2010, slide 14, URL, https://mentor.ieee.org/802.11/dcn/10/11-10-0785-01-00ac-phy-power-saving-features-for-11ac.ppt.

Qualcomm Incorporated (Sampath H., et al.), "802.11 ac Preamble, IEEE 802.11-10/876r0," Jul. 13, 2010, slide 7-slide 9, URL, https://mentor.ieee.org/802.11/dcn/10/11-10-0876-00-00ac-11ac-preamble.pptx.

Stacey R., et al., "IEEE P802.11 Wireless LANs—Specification Framework for TGac," IEEE 802.11-09/0992r18, Sep. 2010, 44 Pages.

Kim J., et al., "GroupID Concept for Downlink MU-MIMO Transmission", Jan. 18, 2010 (Jan. 18, 2010), pages SLIDE 1-SLIDE 8, XP002645417, Retrieved from the Internet: URL:https://mentor.ieee.org/.../11-10-0073-00-00ac-group-id-concept-for-dl-mu-mimo.ppt [retrieved on Jun. 28, 2011].

Nee R.V., et al., "VHT-SIG-A2 Fields and Order (IEEE 802.11-10/1052r0)", Sep. 9, 2010, pp. 1-9, XP055010545, Retrieved from the Internet: URL: https://mentor.ieee.org/802.11/dcn/10/11-10-1052-00-00ac-vht-sig-a-and-vht-sig-b-field-structure.ppt&ei=XwCoTsKnOcyn8QPZ2uilDw&usg=AFWCNGeUNTNKReNDMAPryIOPIh7MvHw&cad=rja [retrieved on Oct. 26, 2011].

* cited by examiner

PHYSICAL LAYER POWER SAVE FACILITY

CROSS-REFERENCE TO RELATED APPLICATIONS

This application claims benefit of U.S. Provisional Patent Application Ser. No. 61/411,905, filed Nov. 9, 2010, and U.S. Provisional Patent Application Ser. No. 61/414,872, filed Nov. 17, 2010, both herein incorporated by reference.

TECHNICAL FIELD

Certain aspects of the present disclosure generally relate to wireless communications and, more particularly, to utilizing unused bits in a packet for transmitting power-saving information.

BACKGROUND

In order to address the issue of increasing bandwidth requirements that are demanded for wireless communications systems, different schemes are being developed to allow multiple user terminals to communicate with a single access point by sharing the channel resources while achieving high data throughputs. Multiple Input or Multiple Output (MIMO) technology represents one such approach that has recently emerged as a popular technique for the next generation communication systems. MIMO technology has been adopted in several emerging wireless communications standards such as the Institute of Electrical and Electronics Engineers (IEEE) 802.11 standard. IEEE 802.11 denotes a set of Wireless Local Area Network (WLAN) air interface standards developed by the IEEE 802.11 committee for short-range communications (e.g., tens of meters to a few hundred meters).

A MIMO wireless system employs a number ($N_T$) of transmit antennas and a number ($N_R$) of receive antennas for data transmission. A MIMO channel formed by the $N_T$ transmit and $N_R$ receive antennas may be decomposed into $N_S$ spatial streams, where, for all practical purposes, $NS<=\min\{N_T, NR\}$. The $N_S$ spatial streams may be used to transmit $N_S$ independent data streams to achieve greater overall throughput.

In wireless networks with a single access point and multiple stations, concurrent transmissions may occur on multiple channels toward different stations, both in the uplink and downlink directions.

SUMMARY

Certain aspects of the present disclosure provide a method for wireless communications. The method generally includes generating a first message comprising a field, wherein the field comprises a portion of a basic service set identifier (BSSID) if used in a single-user transmission scheme, or an indication of a number of space time streams if used in a multi-user transmission scheme, and transmitting the first message.

Certain aspects of the present disclosure provide an apparatus for wireless communications. The apparatus generally includes circuit configured to generate a first message comprising a field, wherein the field comprises a portion of a basic service set identifier (BSSID) if used in a single-user transmission scheme, or an indication of a number of space time streams if used in a multi-user transmission scheme, and a transmitter configured to transmit the first message.

Certain aspects of the present disclosure provide an apparatus for wireless communications. The apparatus generally includes means for generating a first message comprising a field, wherein the field comprises a portion of a basic service set identifier (BSSID) if used in a single-user transmission scheme, or an indication of a number of space time streams if used in a multi-user transmission scheme, and means for transmitting the first message.

Certain aspects provide a computer-program product for wireless communications. The computer-program product includes a computer-readable medium comprising instructions executable to generate a first message comprising a field, wherein the field comprises a portion of a basic service set identifier (BSSID) if used in a single-user transmission scheme, or an indication of a number of space time streams if used in a multi-user transmission scheme, and transmit the first message.

Certain aspects of the present disclosure provide an access terminal for wireless communications. The access terminal generally includes at least one antenna, circuit configured to generate a first message comprising a field, wherein the field comprises a portion of a basic service set identifier (BSSID) if used in a single-user transmission scheme, or an indication of a number of space time streams if used in a multi-user transmission scheme, and a transmitter configured to transmit, via the at least one antenna, the first message.

Certain aspects of the present disclosure provide a method for wireless communications. The method generally includes assigning one or more association identifiers (AIDs) to one or more apparatuses, wherein the one or more AIDs are different from a portion of the basic service set identifier (BSSID) of an apparatus, and notifying the one or more apparatuses of the assigned AIDs.

Certain aspects of the present disclosure provide an apparatus for wireless communications. The apparatus generally includes circuit configured to assign one or more association identifiers (AIDs) to one or more apparatuses, wherein the one or more AIDs are different from a portion of the basic service set identifier (BSSID) of the apparatus, and circuit configured to notify the one or more apparatuses of the assigned AIDs.

Certain aspects of the present disclosure provide an apparatus for wireless communications. The apparatus generally includes means for assigning one or more association identifiers (AIDs) to one or more apparatuses, wherein the one or more AIDs are different from a portion of the basic service set identifier (BSSID) of an apparatus, and means for notifying the one or more apparatuses of the assigned AIDs.

Certain aspects provide a computer-program product for wireless communications. The computer-program product includes a computer-readable medium comprising instructions executable to assign one or more association identifiers (AIDs) to one or more apparatuses, wherein the one or more AIDs are different from a portion of the basic service set identifier (BSSID) of the apparatus, and notify the one or more apparatuses of the assigned AIDs.

Certain aspects of the present disclosure provide an access point for wireless communications. The access point generally includes A plurality of antennas, circuit configured to assign one or more association identifiers (AIDs) to one or more apparatuses, wherein the one or more AIDs are different from a portion of the basic service set identifier (BSSID) of the apparatus, and circuit configured to notify, via the plurality of antennas, the one or more apparatuses of the assigned AIDs.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects of certain aspects of the present disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

The word "exemplary" is used herein to mean "serving as an example, instance, or illustration." Any aspect described herein as "exemplary" is not necessarily to be construed as preferred or advantageous over other aspects. Also as used herein, the term "legacy stations" generally refers to wireless network nodes that support the Institute of Electrical and Electronics Engineers (IEEE) 802.11n or earlier versions of the IEEE 802.11 standard.

The multi-antenna transmission techniques described herein may be used in combination with various wireless technologies such as Code Division Multiple Access (CDMA), Orthogonal Frequency Division Multiplexing (OFDM), Time Division Multiple Access (TDMA), Spatial Division Multiple Access (SDMA), and so on. Multiple user terminals can concurrently transmit/receive data via different (1) orthogonal code channels for CDMA, (2) time slots for TDMA, or (3) sub-bands for OFDM. A CDMA system may implement IS-2000, IS-95, IS-856, Wideband-CDMA (W-CDMA), or some other standards. An OFDM system may implement IEEE 802.11 or some other standards. A TDMA system may implement GSM or some other standards. These various standards are known in the art.

An Example MIMO System

Figure 1:
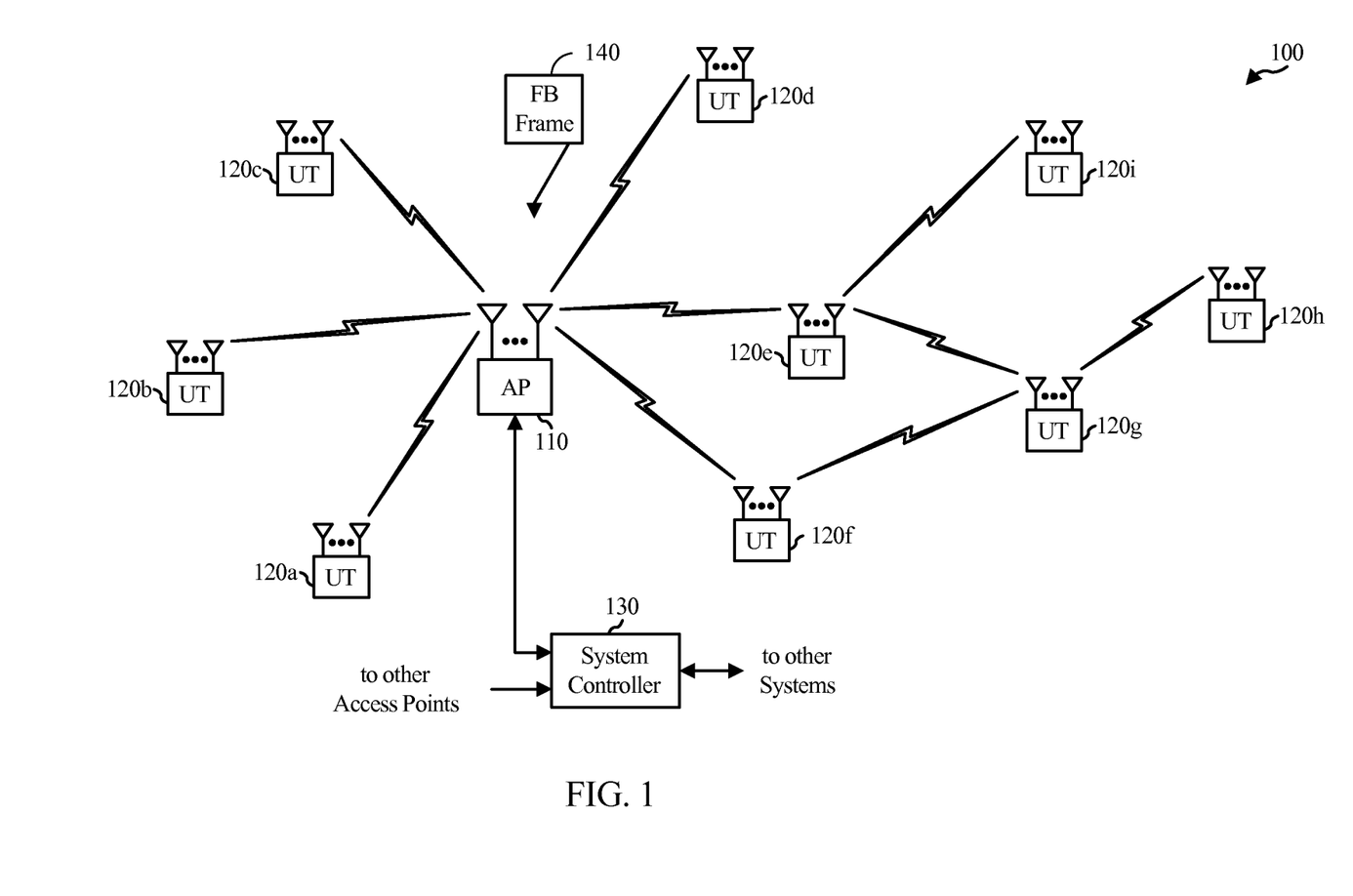
FIG. 1 illustrates a diagram of a wireless communications network in accordance with certain aspects of the present disclosure.

FIG. 1 illustrates a multiple-access MIMO system 100 with access points and user terminals. For simplicity, only one access point 110 is shown in FIG. 1. An access point (AP) is generally a fixed station that communicates with the user terminals and may also be referred to as a base station or some other terminology. A user terminal may be fixed or mobile and may also be referred to as a mobile station, a station (STA), a client, a wireless device, or some other terminology. A user terminal may be a wireless device, such as a cellular phone, a personal digital assistant (PDA), a handheld device, a wireless modem, a laptop computer, a personal computer, etc.

Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

System 100 employs multiple transmit and multiple receive antennas for data transmission on the downlink and uplink. Access point 110 is equipped with a number $N_{ap}$ of antennas and represents the multiple-input (MI) for downlink transmissions and the multiple-output (MO) for uplink transmissions. A set $N_u$ of selected user terminals 120 collectively represents the multiple-output for downlink transmissions and the multiple-input for uplink transmissions. In certain cases, it may be desirable to have $N_{ap} \geq N_u \geq 1$ if the data symbol streams for the $N_u$ user terminals are not multiplexed in code, frequency, or time by some means. $N_u$ may be greater than $N_{ap}$ if the data symbol streams can be multiplexed using different code channels with CDMA, disjoint sets of sub-bands with OFDM, and so on. Each selected user terminal transmits user-specific data to and/or receives user-specific data from the access point. In general, each selected user terminal may be equipped with one or multiple antennas (i.e., $N_{ut} \geq 1$). The $N_u$ selected user terminals can have the same or different number of antennas.

MIMO system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported).

Figure 2:
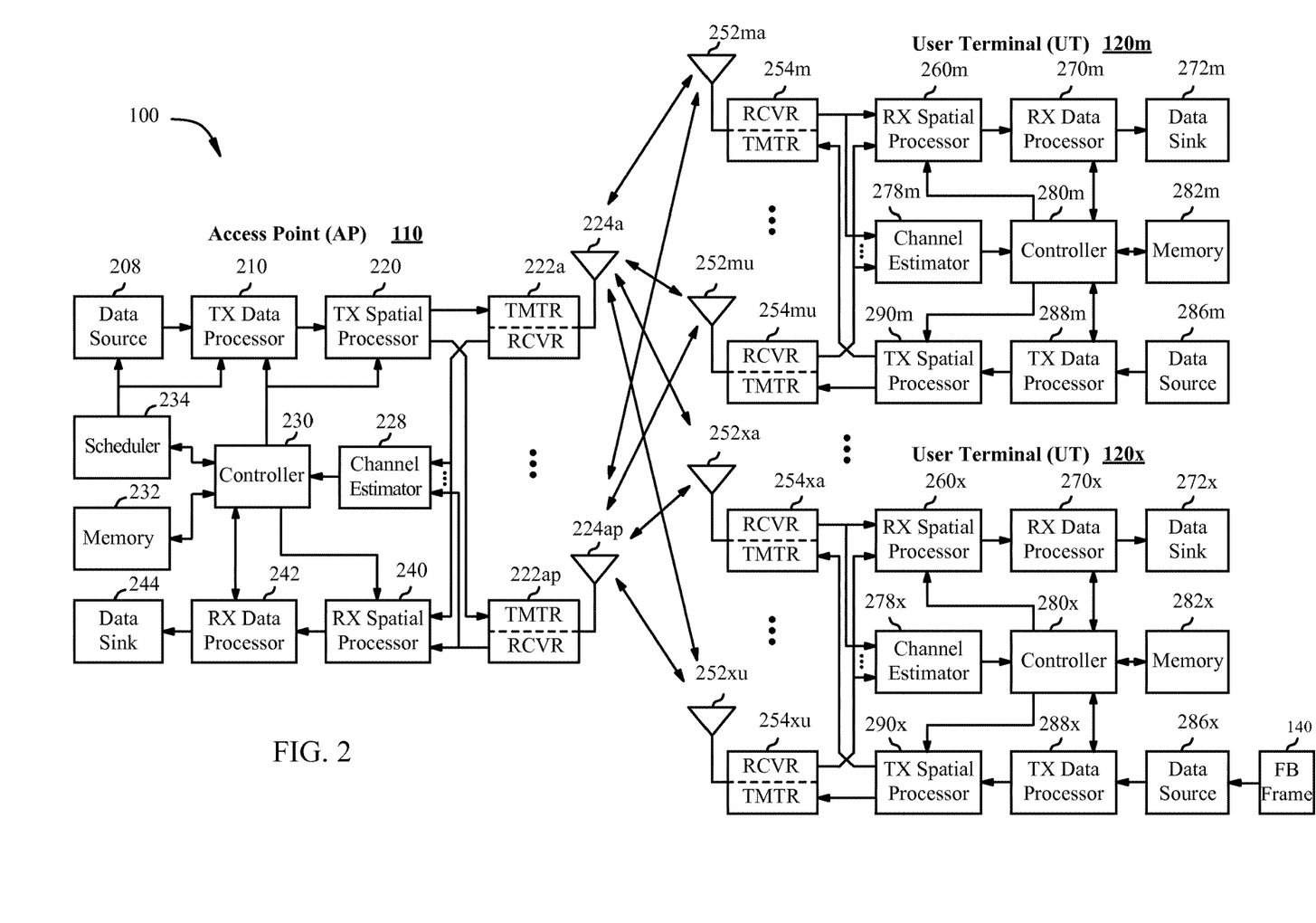
FIG. 2 illustrates a block diagram of an example access point and user terminals in accordance with certain aspects of the present disclosure.

FIG. 2 shows a block diagram of access point 110 and two user terminals 120*m* and 120*x* in MIMO system 100. Access point 110 is equipped with $N_{ap}$ antennas 224*a* through 224*ap*. User terminal 120*m* is equipped with $N_{ut,m}$ antennas 252*ma* through 252*mu*, and user terminal 120*x* is equipped with $N_{ut,x}$ antennas 252*xa* through 252*xu*. Access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a frequency channel, and a "receiving entity" is an independently operated apparatus or device capable of receiving data via a frequency channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data $\{d_{up,m}\}$ for the user terminal based on the coding and modulation schemes associated with the rate selected for the user terminal and provides a data symbol stream $\{s_{up,m}\}$. A TX spatial processor 290 performs spatial processing on the data symbol stream $\{s_{up,m}\}$ and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point 110.

A number $N_{up}$ of user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), successive interference cancellation (SIC), or some other technique. Each recovered uplink data symbol stream $\{s_{up,m}\}$ is an estimate of a data symbol stream $\{s_{up,m}\}$ transmitted by a respective user terminal. An RX data processor 242 processes (e.g., demodulates, deinterleaves, and decodes) each recovered uplink data symbol stream $\{s_{up,m}\}$ in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230 and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing on the $N_{dn}$ downlink data symbol streams, and provides $N_{ap}$ transmit symbol streams for the $N_{ap}$ antennas. Each transmitter unit (TMTR) 222 receives and processes a respective transmit symbol stream to generate a downlink signal. $N_{ap}$ transmitter units 222 provide $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit (RCVR) 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream $\{s_{dn,m}\}$ for the user terminal. The receiver spatial processing is performed in accordance with the CCMI, MMSE, or some other technique. An RX data processor 270 processes (e.g., demodulates, deinterleaves, and decodes) the recovered downlink data symbol stream to obtain decoded data for the user terminal.

At each user terminal 120, $N_{ut,m}$ antennas 252 receive the $N_{ap}$ downlink signals from access point 110. Each receiver unit (RCVR) 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream $\{s_{dn,m}\}$ for the user terminal. The receiver spatial processing is performed in accordance with the CCMI, MMSE, or some other technique. An RX data processor 270 processes (e.g., demodulates, deinterleaves, and decodes) the recovered downlink data symbol stream to obtain decoded data for the user terminal.

Figure 3:
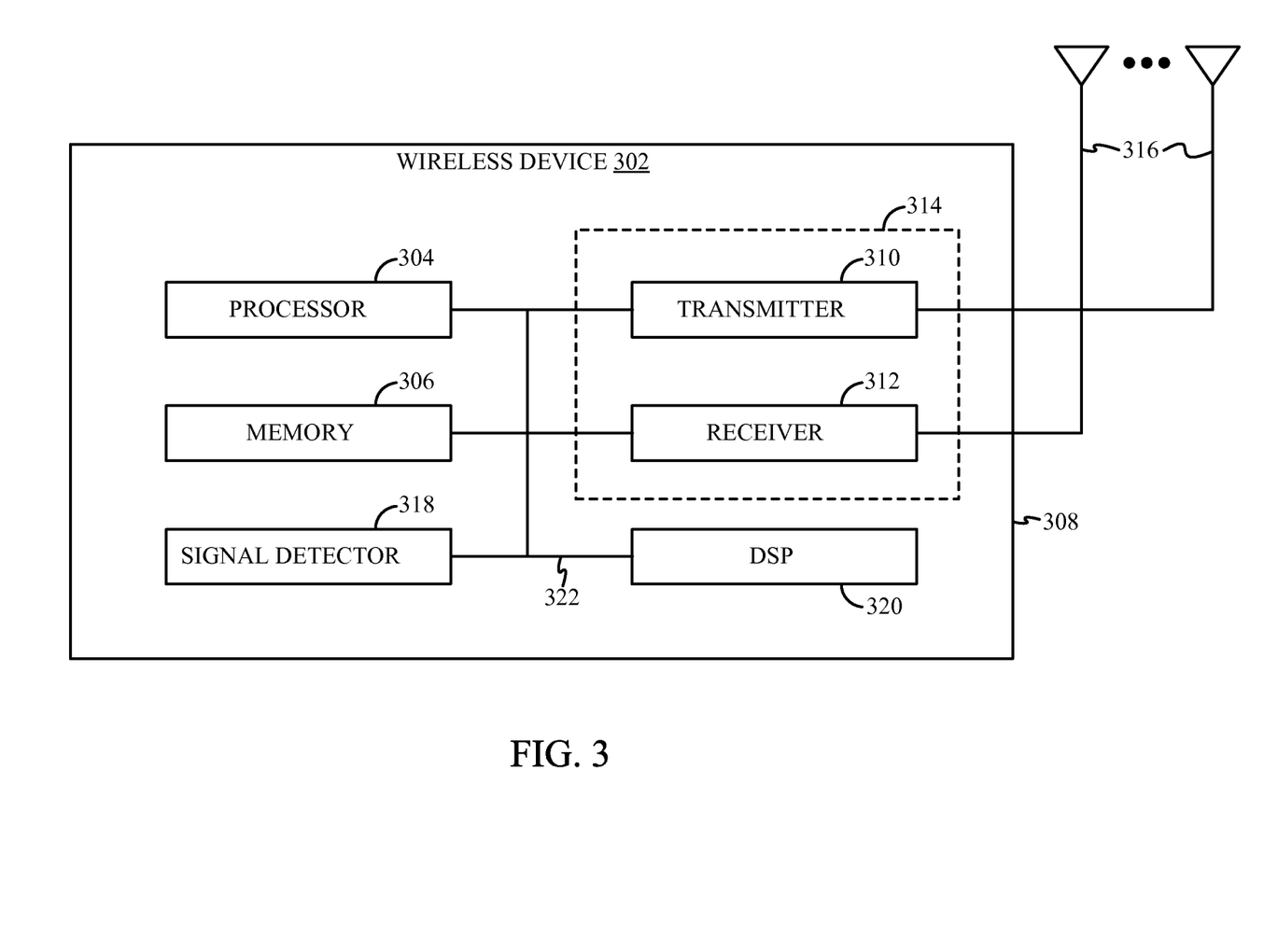
FIG. 3 illustrates a block diagram of an example wireless device in accordance with certain aspects of the present disclosure.

FIG. 3 illustrates various components that may be utilized in a wireless device 302 that may be employed within the system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Those skilled in the art will recognize the techniques described herein may be generally applied in systems utilizing any type of multiple access schemes, such as SDMA, OFDMA, CDMA, and combinations thereof.

Physical Layer Power Save Facility

Certain aspects of the present disclosure propose a method to transmit information in unused fields of a physical layer header to improve performance of the system. The proposed method transmits, during single user transmission, a portion of the basic service set identifier (BSSID) of an access point in a field of a header that is usually used to indicate number of space time streams (Nsts).

The IEEE 802.11ac standard, which is also referred to as Very High Throughput (VHT), supports high throughput operation of the network which is realized through several measures such as parallel transmissions to multiple stations (STAs) at once, or by using a wide channel bandwidth, such as 80 MHz or 160 MHz.

The 802.11ac physical (PHY) header format may contain a field named 'Number of Space Time Streams (Nsts)' field. The Nsts field may be required for multi-user (MU) transmissions, but it may partly be unused for single-user (SU) transmissions. For example, bits 13-21 (9 bits) of the Nsts field may be unused. These 9 bits of the Nsts field may be used to signal a partial association identifier (AID), so that stations (STAs) with a different partial AID can stop receiving a packet after having received a partial AID that is different from their own.

The access point does not assign an AID to itself, so it is undefined what the value of this 9-bit field should be for transmissions to the AP. Such transmissions to an AP are referred to as uplink transmissions.

For certain aspects, the unused Nsts field may be filled with a partial basic service set identifier (BSSID) for uplink single user (SU) packets, and with a partial AID for unicast downlink SU packets. The BSSID is the media access control (MAC) address of the AP, which implies that the 9-bit field of uplink SU transmissions contains the first 9 bits of the medium access control (MAC) address of the AP. Note that the 9 bits are exemplary only.

Figure 4A:
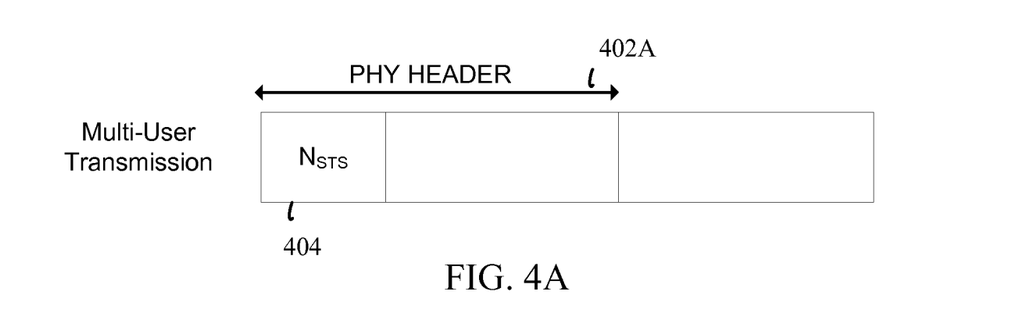
FIGS. 4A-4C illustrate example packets that may be transmitted in single user or multi-user transmission schemes, in accordance with certain aspects of the present disclosure.
Figure 4B:
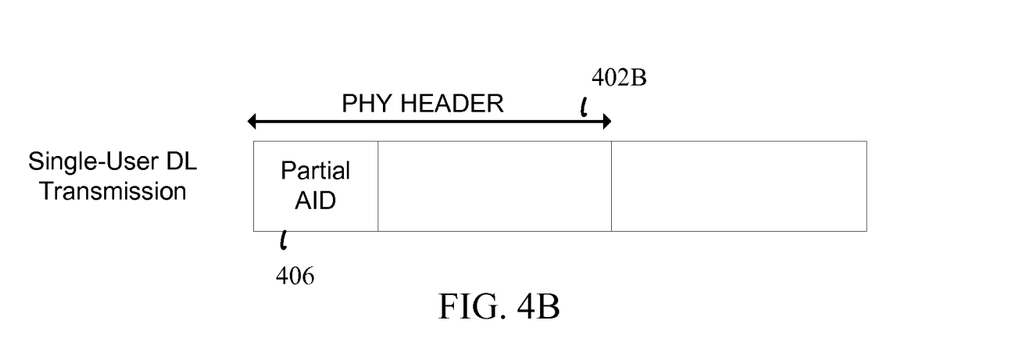
Figure 4C:
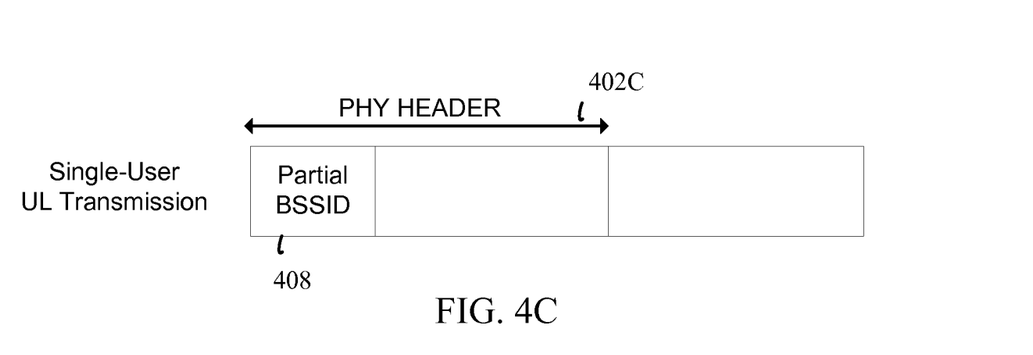

FIGS. 4A-4C illustrate example packets that may be transmitted in single user or multi-user transmission schemes, in accordance with certain aspects of the present disclosure.

FIG. 4A illustrates an example message format (e.g., a packet) which includes a PHY header 402A and a field 404 that may be used to transmit an indication of the number of space time streams ($N_{STS}$) when used for multi-user transmission.

FIG. 4B illustrates a message transmitted using single-user downlink transmission. The message may include a PHY header 402B field 406 with portion of the AID of a station for which the packet is targeted.

FIG. 4C illustrates a message transmitted using single user uplink transmission. The message may include a PHY header 402C with a field 408 with a portion of the BSSID of the access point for which the message is targeted.

For certain aspects, while assigning AIDs to STAs, the AP may skip AIDs with a partial AID equal to its partial BSSID (e.g., equal to the 9 least significant bits (LSBs) of its MAC address).

For certain aspects, while assigning AIDs to STAs, the AP may also skip partial BSSIDs of other APs in its neighborhood. These BSSIDs may be obtained through received Beacons from the surrounding APs.

Using a partial AID for unicast downlink SU packets may ensure that there will be no collisions within a BSS. In other words, each STA may have a unique value inside PHY header directed at it, allowing all other STAs in the BSS to go back to sleep for the remaining duration of the packet (up to 510 devices, which is equal 512 values for a 9-bit field, less the broadcast partial AID (all 0s) and the partial BSSID of the AP).

For certain aspects, uplink transmissions may not collide within the BSS, but they may collide with the partial AID of STAs in other BSSs. However, the probability that this occurs is low. For certain aspects, an STA may request a different AID if it detects a collision with another AP or with a STA in another BSS.

Figure 5:
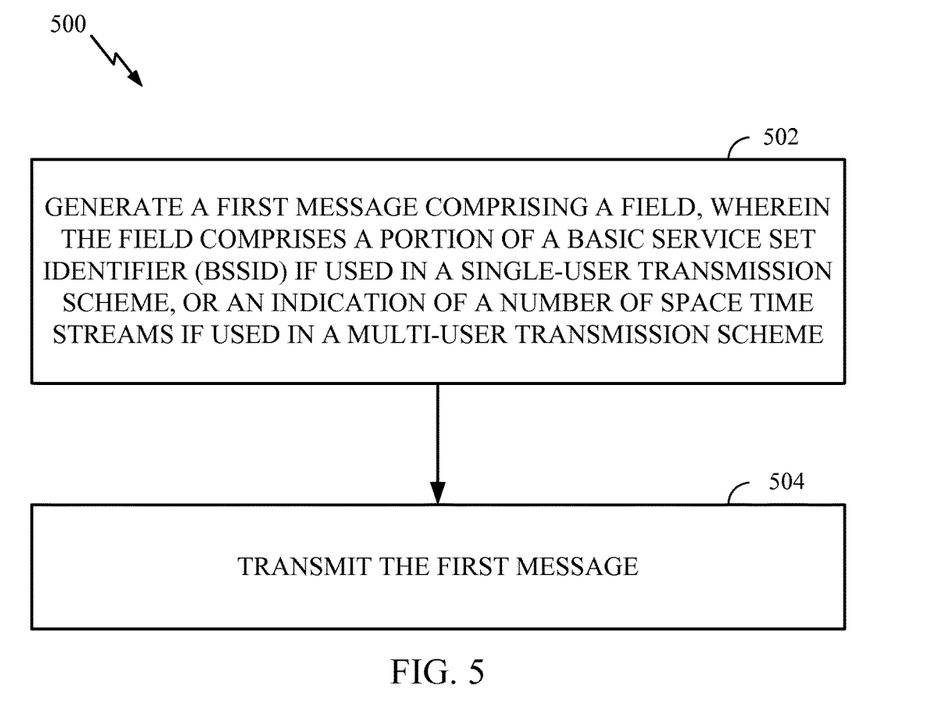
FIG. 5 illustrates example operations for facilitating power savings that may be performed by a station, in accordance with certain aspects of the present disclosure.

FIG. 5 illustrates example operations 500 for facilitating power savings that may be performed by a station, in accordance with certain aspects of the present disclosure.

The operations begin, at 502, with the station generating a first message comprising a field, wherein the field comprises a portion of a basic service set identifier (BSSID) if used in a single-user transmission scheme, or an indication of a number of space time streams if used in a multi-user transmission scheme. At 504, the station transmits the first message to an access point. The station may also receive a second message comprising a field, wherein the field comprises a portion of an association identifier (AID) if the second message is transmitted utilizing a single-user transmission scheme, or an indication of number of space time streams if the second message is transmitted utilizing a multi-user transmission scheme.

For certain aspects, the station may compare the received AID with its AID and discarding the second message if the received AID is different from its AID.

Figure 6:
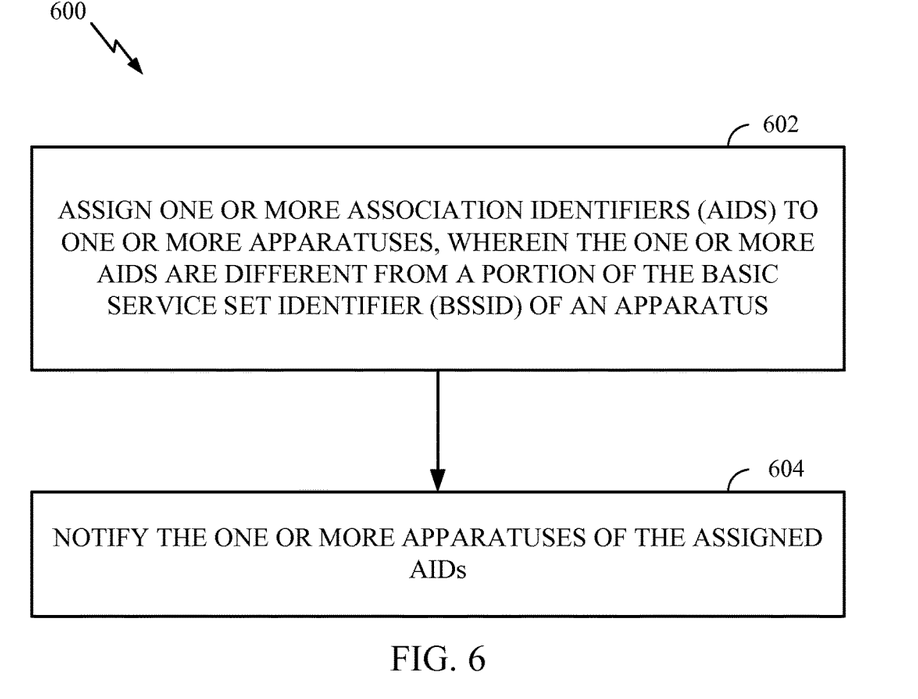
FIG. 6 illustrates example operations for facilitating power savings that may be performed by an access point, in accordance with certain aspects of the present disclosure.

FIG. 6 illustrates example operations 600 for facilitating power savings that may be performed by an access point, in accordance with certain aspects of the present disclosure.

The operations begin, at 602, with the access point assigning one or more association identifiers (AIDs) to one or more apparatuses, wherein the one or more AIDs are different from a portion of the basic service set identifier (BSSID) of an apparatus. At 604, the access point notifies the one or more apparatuses of the assigned AIDs.

Figure 5A:
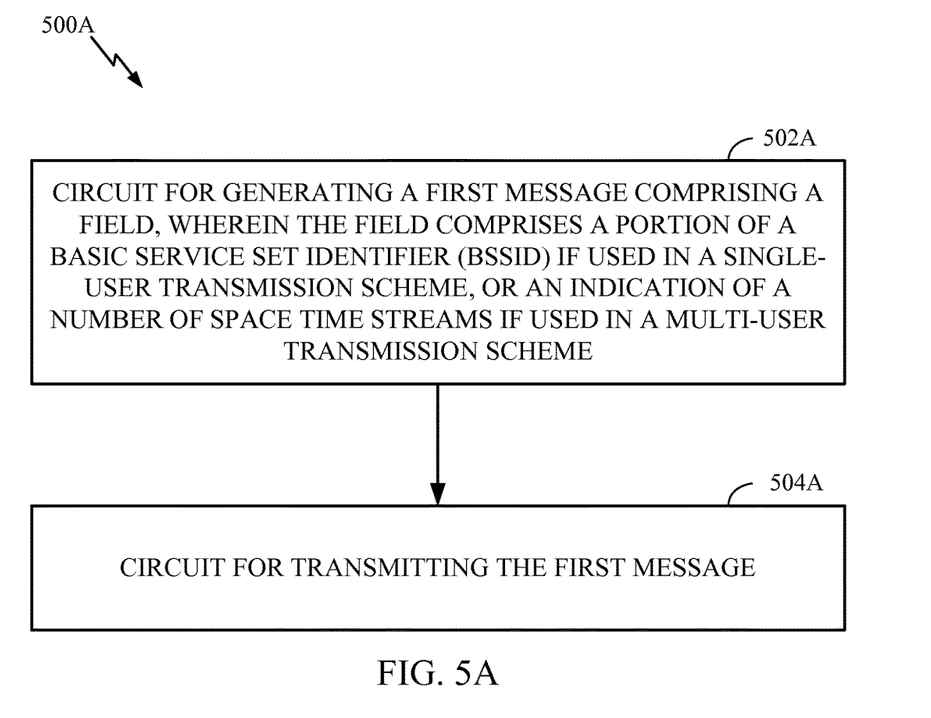
FIG. 5A illustrates example components capable of performing the operations shown in FIG. 5.
Figure 6A:
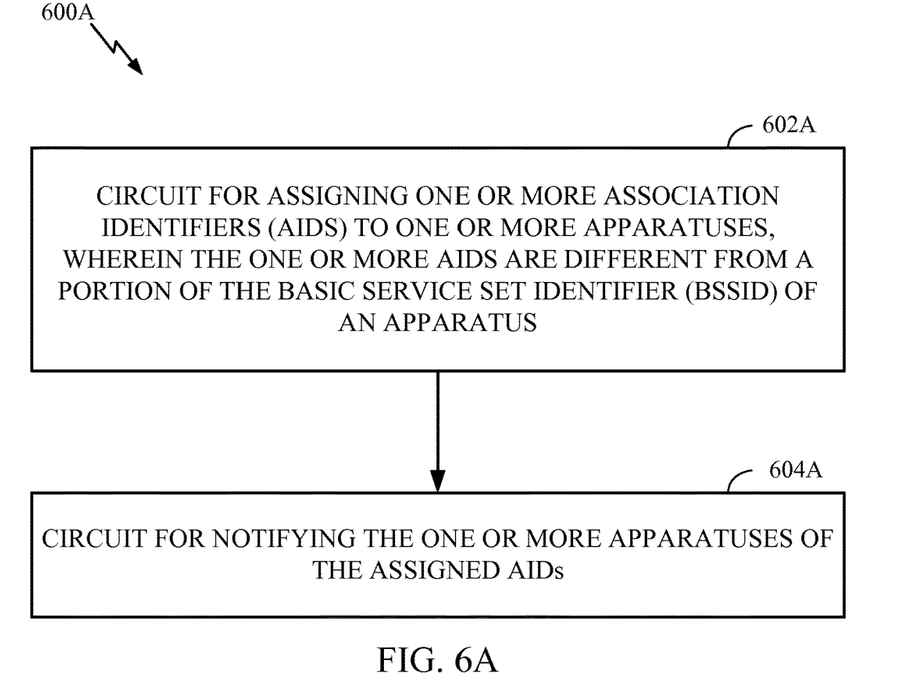
FIG. 6A illustrates example components capable of performing the operations shown in FIG. 6.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, blocks 502-504 in FIG. 5 correspond to circuit blocks 502A-504A illustrated in FIG. 5A. In addition, blocks 602-604 in FIG. 6 correspond to circuit blocks 602A-604A illustrated in FIG. 6A.

For certain aspects, means for receiving comprises a receiver, means for transmitting comprises a transmitter and means for determining a transmission mode comprises a circuit configured to determine the transmission mode of the signal.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

It should be noted that means for transmitting comprises a transmitter, means for receiving comprises a receiver, means for generating comprises any suitable generating component such as a processor, means for assigning comprises any suitable assigning component such as a processor and means for notifying may comprise a transmitter.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, the phrase "at least one of A or B" is meant to include any combination of A and B. In other words, "at least one of A or B" comprises the following set: [A], [B] and [A, B].

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

It is to be understood that the claims are not limited to the precise configuration and components illustrated above. Various modifications, changes and variations may be made in the arrangement, operation and details of the methods and apparatus described above without departing from the scope of the claims.

The techniques provided herein may be utilized in a variety of applications. For certain aspects, the techniques presented herein may be incorporated in an access point station, an access terminal, a mobile handset, or other type of wireless device with processing logic and elements to perform the techniques provided herein.

While the foregoing is directed to aspects of the present disclosure, other and further aspects of the disclosure may be devised without departing from the basic scope thereof, and the scope thereof is determined by the claims that follow.

The invention claimed is:

1. An apparatus for wireless communications, comprising:
a circuit configured to:
determine a first transmission scheme for transmitting a first message comprising a first field in a first header having a first header format; and
generate the first message comprising the first field, wherein generating the first message comprises including a portion of a basic service set identifier (BSSID) in the first field based on the determined first transmission scheme being a single-user transmission scheme; and
a transmitter configured to transmit the first message to another apparatus based on the determined first transmission scheme, wherein:
the circuit is further configured to determine a second transmission scheme for transmitting a second message comprising a second field in a second header having a second header format;
the circuit is further configured to generate the second message comprising the second field, wherein generating the second message comprises including an indication of a number of space time streams based on the determined second transmission scheme being a multi-user transmission scheme;
locations of bits that form the first field in the first header format and locations of bits that form the second field in the second header format are the same; and
the transmitter is further configured to transmit the second message.

2. The apparatus of claim 1, wherein the portion of the BSSID comprises a plurality of least significant bits of the BSSID.

3. The apparatus of claim 1, further comprising:
a receiver configured to receive a third message comprising a third field, wherein the third field is based on a portion of an association identifier (AID) if the third message is transmitted using the single-user transmission scheme, or an indication of a number of space time streams if the third message is transmitted using the multi-user transmission scheme.

4. The apparatus of claim 3, wherein:
the third field comprises the portion of the AID; and
the apparatus further comprises:
a circuit configured to compare the portion of the AID with a corresponding portion of an AID associated with the apparatus; and
a circuit configured to discard the third message if the portion of the AID is different from the corresponding portion of the AID associated with the apparatus.

5. A method for wireless communications, comprising:
determining a first transmission scheme for transmitting a first message comprising a first field in a first header having a first header format;
generating, at an apparatus, the first message comprising the first field, wherein generating the first message comprises including a portion of a basic service set identifier (BSSID) in the first field based on the determined first transmission scheme being a single-user transmission scheme; and
transmitting the first message to another apparatus based on the determined first transmission scheme;
determining a second transmission scheme for transmitting a second message comprising a second field in a second header having a second header format;
generating the second message comprising the second field, wherein generating the second message comprises including an indication of a number of space time streams based on the determined second transmission scheme being a multi-user transmission scheme, wherein locations of bits that form the first field in the first header format and locations of bits that form the second field in the second header format are the same; and
transmitting the second message.

6. The method of claim 5, wherein the portion of the BSSID comprises a plurality of least significant bits of the BSSID.

7. The method of claim 5, further comprising:
receiving a third message comprising a third field, wherein the third field is based on a portion of an association identifier (AID) if the third message is transmitted using the single-user transmission scheme, or an indication of a number of space time streams if the third message is transmitted using the multi-user transmission scheme.

8. The method of claim 7, wherein the third field comprises the portion of the AID, the method further comprising:
comparing the portion of the AID with a corresponding portion of an AID associated with the apparatus; and
discarding the third message if the portion of the AID is different from the corresponding portion of the AID associated with the apparatus.

9. An apparatus for wireless communications, comprising:
means for determining a first transmission scheme for transmitting a first message comprising a first field in a first header having a first header format;
means for generating the first message comprising the first field, wherein generating the first message comprises including a portion of a basic service set identifier (BSSID) in the first field based on the determined first transmission scheme being a single-user transmission scheme; and means for transmitting the first message to another apparatus based on the determined first transmission scheme;

means for determining a second transmission scheme for transmitting a second message comprising a second field in a second header having a second header format;

means for generating the second message comprising the second field, wherein generating the second message comprises including an indication of a number of space time streams in the second field based on the determined second transmission scheme being a multi-user transmission scheme, wherein locations of bits that form the first field in the first header format and locations of bits that form the second field in the second header format are the same; and means for transmitting the second message.

10. The apparatus of claim 9, wherein the portion of the BSSID comprises a plurality of least significant bits of the BSSID.

11. The apparatus of claim 9, further comprising:
means for receiving a third message comprising a third field, wherein the third field is based on a portion of an association identifier (AID) if the third message is transmitted using the single-user transmission scheme, or an indication of a number of space time streams if the third message is transmitted using the multi-user transmission scheme.

12. The apparatus of claim 11, wherein the third field comprises the portion of the AID, the apparatus further comprising:
means for comparing the portion of the AID with a corresponding portion of an AID associated with the apparatus; and
means for discarding the third message if the portion of the AID is different from the corresponding portion of the AID associated with the apparatus.

13. A non-transitory computer-readable medium encoded with instructions executable to:
determine a first transmission scheme for transmitting a first message comprising a first field in a first header having a first header format;
generate, at an apparatus, the first message comprising the first field, wherein generating the first message comprises including a portion of a basic service set identifier (BSSID) in the first field based on the determined first transmission scheme being a single-user transmission scheme; and
transmit the first message to another apparatus based on the determined first transmission scheme;
determine a second transmission scheme for transmitting a second message comprising a second field in a second header having a second header format;
generate the second message comprising the second field, wherein generating the second message comprises including an indication of a number of space time streams in the second field based on the determined second transmission scheme being a multi-user transmission scheme, wherein locations of bits that form the first field in the first header format and locations of bits that form the second field in the second header format are the same; and
transmit the second message.

14. An access terminal, comprising:
at least one antenna;
a circuit configured to:
determine a first transmission scheme for transmitting a first message comprising a first field in a first header having a first header format; and
generate the first message comprising the first field, wherein generating the first message comprises including a portion of a basic service set identifier (BSSID) in the first field based on the determined first transmission scheme being a single-user transmission scheme; and
a transmitter configured to transmit, via the at least one antenna, the first message to another apparatus based on the determined first transmission scheme, wherein:
the circuit is further configured to determine a second transmission scheme for transmitting a second message comprising a second field in a second header having a second header format;
the circuit is further configured to generate the second message comprising the second field, wherein generating the second message comprises including an indication of a number of space time streams in the second field based on the determined second transmission scheme being a multi-user transmission scheme;
locations of bits that form the first field in the first header format and locations of bits that form the second field in the second header format are the same; and
the transmitter is further configured to transmit the second message via the at least one antenna.

15. An apparatus for wireless communications, comprising:
a circuit configured to assign one or more association identifiers (AIDs) to one or more other apparatuses, wherein assigning the AIDs comprises skipping a plurality of identifiers having a portion that is the same as a portion of a basic service set identifier (BSSID) of the apparatus, wherein the portion of the BSSID comprises only a plurality of least significant bits of the BSSID that is a fewer number of bits than a total number of bits of the BSSID, wherein the portion of the plurality of identifiers comprises only a plurality of least significant bits of the plurality of identifiers that are a same number of bits as the portion of the BSSID, and wherein the portion of the plurality of identifiers comprises a fewer number of bits than a total number of bits of the plurality of identifiers; and
a circuit configured to notify the one or more other apparatuses of the assigned AIDs.

16. The apparatus of claim 15, wherein the circuit is further configured to generate a first message comprising a field, the apparatus further comprising:
a transmitter configured to transmit the first message comprising the field, wherein the field is based on a portion of an AID of the one or more AIDs if using a single-user transmission scheme, or an indication of a number of space time streams if using a multi-user transmission scheme.

17. The apparatus of claim 15, further comprising:
a receiver configured to receive a second message comprising a field, wherein the field is based on the portion of the BSSID if the second message was transmitted using a single-user transmission scheme, or an indication of a number of space time streams if the second message was transmitted using a multi-user transmission scheme.

18. The apparatus of claim 17, wherein the field comprises the portion of the BSSID if the second message was transmitted using the single-user transmission scheme, or the indication of the number of space time streams if the second message was transmitted using the multi-user transmission scheme.

19. The apparatus of claim 15, wherein the one or more AIDs are different from one or more BSSIDs of neighboring apparatuses.

20. A method for wireless communications, comprising:
assigning, by an apparatus, one or more association identifiers (AIDs) to one or more other apparatuses, wherein assigning the AIDs comprises skipping a plurality of identifiers having a portion that is the same as a portion of a basic service set identifier (BSSID) of the apparatus, wherein the portion of the BSSID comprises only a plurality of least significant bits of the BSSID that is a fewer number of bits than a total number of bits of the BSSID, wherein the portion of the plurality of identifiers comprises only a plurality of least significant bits of the plurality of identifiers that are a same number of bits as the portion of the BSSID, and wherein the portion of the plurality of identifiers comprises a fewer number of bits than a total number of bits of the plurality of identifiers; and
notifying the one or more other apparatuses of the assigned AIDs.

21. The method of claim 20, further comprising:
generating a first message comprising a field; and
transmitting the first message comprising the field, wherein the field is based on a portion of an AID of the one or more AIDs if using a single-user transmission scheme, or an indication of a number of space time streams if using a multi-user transmission scheme.

22. The method of claim 20, further comprising:
receiving a second message comprising a field, wherein the field is based on the portion of the BSSID if the second message was transmitted using a single-user transmission scheme, or an indication of a number of space time streams if the second message was transmitted using a multi-user transmission scheme.

23. The method of claim 22, wherein the field comprises the portion of the BSSID if the second message was transmitted using the single-user transmission scheme, or the indication of the number of space time streams if the second message was transmitted using the multi-user transmission scheme.

24. The method of claim 20, wherein the one or more AIDs are different from one or more BSSIDs of neighboring apparatuses.

25. An apparatus for wireless communications, comprising:
means for assigning one or more association identifiers (AIDs) to one or more other apparatuses, wherein assigning the AIDs comprises skipping a plurality of identifiers having a portion that is the same as a portion of a basic service set identifier (BSSID) of the apparatus, wherein the portion of the BSSID comprises only a plurality of least significant bits of the BSSID that is a fewer number of bits than a total number of bits of the BSSID, wherein the portion of the plurality of identifiers comprises only a plurality of least significant bits of the plurality of identifiers that are a same number of bits as the portion of the BSSID, and wherein the portion of the plurality of identifiers comprises a fewer number of bits than a total number of bits of the plurality of identifiers; and
means for notifying the one or more other apparatuses of the assigned AIDs.

26. The apparatus of claim 25, further comprising:
means for generating a first message comprising a field; and
means for transmitting the first message comprising the field, wherein the field is based on a portion of an AID of the one or more AIDs if using a single-user transmission scheme, or an indication of a number of space time streams if using a multi-user transmission scheme.

27. The apparatus of claim 25, further comprising:
means for receiving a second message comprising a field, wherein the field is based on the portion of the BSSID if the second message was transmitted using a single-user transmission scheme, or an indication of a number of space time streams if the second message was transmitted using a multi-user transmission scheme.

28. The apparatus of claim 27, wherein the field comprises the portion of the BSSID if the second message was transmitted using the single-user transmission scheme, or the indication of the number of space time streams if the second message was transmitted using the multi-user transmission scheme.

29. The apparatus of claim 25, wherein the one or more AIDs are different from one or more BSSIDs of neighboring apparatuses.

30. A non-transitory computer-readable medium encoded with instructions executable to:
assign, by an apparatus, one or more association identifiers (AIDs) to one or more other apparatuses, wherein assigning the AIDs comprises skipping a plurality of identifiers having a portion that is the same as a portion of a basic services set identifier (BSSID) of the apparatus, wherein the portion of the BSSID comprises only a plurality of least significant bits of the BSSID that is a fewer number of bits than a total number of bits of the BSSID, wherein the portion of the plurality of identifiers comprises only a plurality of least significant bits of the plurality of identifiers that are a same number of bits as the portion of the BSSID, and wherein the portion of the plurality of identifiers comprises a fewer number of bits than a total number of bits of the plurality of identifiers; and
notify the one or more other apparatuses of the assigned AIDs.

31. An access point, comprising:
a plurality of antennas;
a circuit configured to assign one or more association identifiers (AIDs) to one or more apparatuses, wherein assigning the AIDs comprises skipping a plurality of identifiers having a portion that is the same as a portion of a basic service set identifier (BSSID) of the access point, wherein the portion of the BSSID comprises only a plurality of least significant bits of the BSSID that is a fewer number of bits than a total number of bits of the BSSID, wherein the portion of the plurality of identifiers comprises only a plurality of least significant bits of the plurality of identifiers that are a same number of bits as the portion of the BSSID, and wherein the portion of the plurality of identifiers comprises a fewer number of bits than a total number of bits of the plurality of identifiers; and
a circuit configured to notify, via the plurality of antennas, the one or more apparatuses of the assigned AIDs.

* * * * *